US00RE44809E

(19) United States
(12) Reissued Patent
Halton et al.

(10) Patent Number: US RE44,809 E
(45) Date of Reissued Patent: Mar. 18, 2014

(54) RANDOM ACCESS CHANNEL PRIORITIZATION SCHEME

(75) Inventors: John Halton, Ulm (DE); Paul James, Erzhausen (DE)

(73) Assignee: Sony Deutschland GmbH, Berlin (DE)

(21) Appl. No.: 13/557,260

(22) Filed: Jul. 25, 2012

Related U.S. Patent Documents

Reissue of:
(64) Patent No.: 6,621,803
Issued: Sep. 16, 2003
Appl. No.: 09/412,176
Filed: Oct. 4, 1999

U.S. Applications:
(60) Division of application No. 13/113,766, filed on May 23, 2011, now Pat. No. Re. 43,669, which is a continuation of application No. 11/222,486, filed on Sep. 8, 2005, now Pat. No. Re. 42,452.

(30) Foreign Application Priority Data

Oct. 5, 1998 (EP) ..... 98118819

(51) Int. Cl.
*H04W 4/00* (2009.01)

(52) U.S. Cl.
USPC ..... 370/329; 370/320; 370/335; 370/342

(58) Field of Classification Search
USPC ..... 370/320, 329, 335, 342, 310, 338, 458, 370/444
See application file for complete search history.

(56) References Cited

U.S. PATENT DOCUMENTS

| | | | |
|---|---|---|---|
| 5,295,152 | A | 3/1994 | Gudmondson et al. |
| 5,689,503 | A | 11/1997 | Wada et al. |
| 5,729,542 | A | 3/1998 | Dupont |
| 5,742,592 | A | 4/1998 | Scholefield et al. |
| 6,031,827 | A | 2/2000 | Rikkinen et al. |
| 6,111,863 | A | 8/2000 | Rostoker et al. |
| 6,122,270 | A | 9/2000 | Whinnett et al. |
| 6,137,787 | A | 10/2000 | Chawla et al. |
| 6,400,695 | B1 | 6/2002 | Chuah et al. |
| 6,574,212 | B1 | 6/2003 | Jurgensen et al. |
| 6,594,240 | B1 | 7/2003 | Chuah et al. |

(Continued)

FOREIGN PATENT DOCUMENTS

| | | |
|---|---|---|
| EP | 0 639 899 | 2/1995 |
| EP | 0 639 899 A1 | 2/1995 |
| WO | WO 97/19525 | 5/1997 |

*Primary Examiner* — Sonny Trinh
(74) *Attorney, Agent, or Firm* — Frommer Lawrence & Haug LLP; William S. Frommer

(57) ABSTRACT

The present invention relates to a method and to devices for transmitting and receiving data in a code division multiple access telecommunication system. A random access time window (20) is provided, which comprises a plurality of random access slots for transmitting random access data, for example from a mobile station (24) to a base station (25). The plurality of random access slots in the random access time window (20) is divided into at least two groups, whereby the groups are allocated to respective priority classes, whereby the priority classes represent the transmission priorities of the random access data to be transmitted in the random access slots. The present invention allows a reduction in congestion on the random access slots for certain access types at the expense of other access types and a more efficient use of the random access time window.

8 Claims, 2 Drawing Sheets

(56) References Cited

U.S. PATENT DOCUMENTS

| | | | | |
|---|---|---|---|---|
| 6,606,313 | B1 | 8/2003 | Dahlman et al. | |
| 6,697,346 | B1 | 2/2004 | Halton et al. | |
| 6,954,464 | B2 | 10/2005 | Jurgensen et al. | |
| 6,985,474 | B2 * | 1/2006 | Dahlman et al. | 370/347 |
| 7,170,943 | B1 * | 1/2007 | Van Heeswyk et al. | 375/259 |
| 7,324,465 | B2 | 1/2008 | Lim et al. | |
| 7,873,000 | B2 * | 1/2011 | Cheng et al. | 370/329 |
| 8,081,974 | B2 | 12/2011 | Fischer et al. | |
| 2001/0026539 | A1 | 10/2001 | Kornprobst et al. | |
| 2001/0036113 | A1 | 11/2001 | Jurgensen et al. | |

* cited by examiner

RANDOM ACCESS CHANNEL PRIORITIZATION SCHEME

Matter enclosed in heavy brackets [ ] appears in the original patent but forms no part of this reissue specification; matter printed in italics indicates the additions made by reissue.

*More than one reissue application has been filed for the reissue of U.S. Pat. No. 6,621,803. This divisional application Ser. No. 13/557,260, filed Jul. 25, 2012, is a divisional of reissue continuation reissue application Ser. No. 13/113,766, filed May 23, 2011 (now U.S. Pat. No. Re. 43,669), which is a continuation of application Ser. No. 11/222,486, filed Sep. 8, 2005 (now, U.S. Pat. No. Re. 42,452), which is a reissue of application Ser. No. 09/412,176, filed Oct. 4, 1999 (now U.S. Pat. No. 6,621,803).*

The present invention relates to a method and to devices for transmitting and receiving data in a code division multiple-access telecommunication system.

A telecommunication system is a system, in which data are communicated between one or more base stations or one or more mobile stations. Thereby, the communication area is divided in cells, in which one base station communicates with one or more mobile stations. Multiple access stations are used to support the simultaneous access of a plurality of mobile stations to one base station within delimited resources of the transmission system. Several multiple access systems are known, for example frequency division as multiple access (FDMA), time division multiple access (TDMA), or code division multiple access (CDMA). Additional to these basic types of multiple access systems, combinations of these different systems are possible and in practical use. The GSM-system for example uses a combination of FDMA and TDMA.

The present invention particularly relates to the transmission and reception of random access data in a code division multiple access system. Random access data are transmitted in the so-called random access channel (RACH) from a mobile station to build up a connection with a base station. The random access data from the mobile station can contain a request, if the base station has sufficient resources available to build up the required connection.

Figure 1:
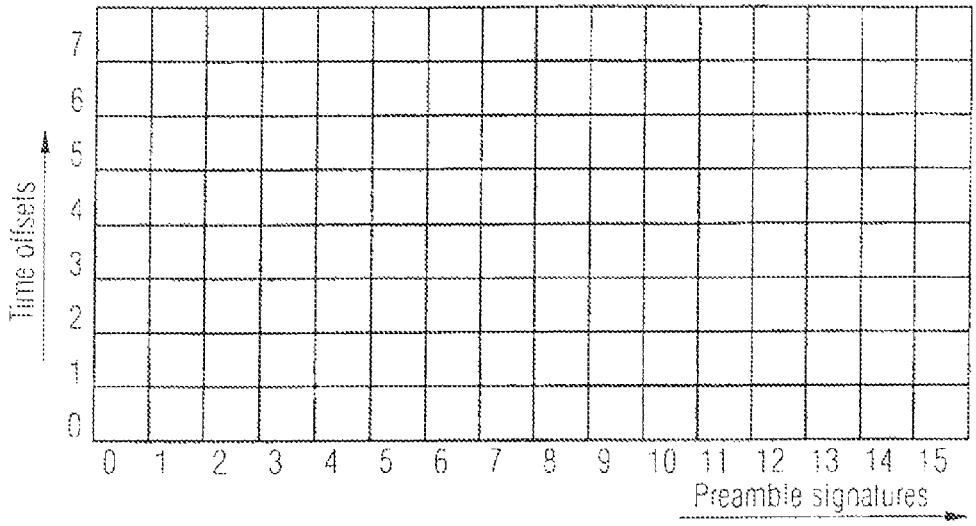

The random access channel comprises or consists of succeedingly or periodically provided random access time windows, in which several random access slots are available. An example for such a known random access time window is shown in FIG. 1. The different random access slots are randomly chosen by a mobile station for the transmission of random access data. In a currently proposed wide band direct sequence CDMA (WCDMA) system the random access time windows are based upon an initial preamble scrambling code, which differentiates between one cell and another cell. Thereby, these codes need to be planned to ensure that neighbouring cells do not use the same code. Therefore, within the preamble part of each random access burst, is provided the preamble signature, which is one of 16 separate codes available for use within that cell. These 16 codes can be seen as separate slots. One of these codes is chosen randomly by the mobile station for the transmission of random access data.. Beforehand, the base station broadcasts, which codes are available in each cell over the broadcast control channel (BCCH) In addition, within one time frame (10 ms) are provided 8 time offsets, each of 1.25 ms, allowing further 8 variations. In other words, in each time frame a random access time window is provided, which comprises a plurality of random access slots for transmitting random access data from one or more mobile stations to the base station. The random access time window thereby extends over the time frame of 10 ms so that 128 different random access slots (16 separate preamble codes and 8 time offsets) are provided within one random access time window. This case is shown in FIG. 1.

A collision, i.e. a situation, where the messages collide and are lost, only occurs, when both, the preamble code and the time offset are chosen in the same random access time window. In practice it is expected that only about 30% of the theoretical maximum of 128 accesses per 10 ms will be possible.

In a situation, where a number of packet data users are operating in a burst traffic situation, this maximum could be quickly reached. In such a situation the access to the network will either become slower or not be possible at all. This is due to congestion caused by the build-up of first time requests and the retransmissions made necessary by previous collisions. Since the access to the random access slots is contention based, a guaranteed upper limit on the amount of time needed to access the system even after an initial bust is not ensured. For packet data applications, which demand a constant periodic delivery of data, ready access is critical.

The object of the present invention is thus to provide a method and devices for transmitting and receiving data in a code division multiple access telecommunication system, in which a random access time window comprising a plurality of random access slots for transmitting random access data is provided and which enable a reduced congestion on the random access slots and a more efficient use of the random access time window.

This object is achieved by a method for transmitting and receiving data in a code division multiple access telecommunication system, comprising the steps of providing a random access time window comprising a plurality of random access slots for transmitting random access data from at least one first communication device to a second communication device, dividing a plurality of random access slots of the random access time window into at least two groups, and allocating the groups to respective priority classes, whereby the priority classes represent the transmission priorities of the random access data to be transmitted in the random access slots.

The first communication device can thereby be a mobile station and the second communication device can thereby be a base station of the telecommunication system.

The above object is further achieved by a device for transmitting and receiving data in a code division multiple access telecommunication system, in which a random access time window comprising a plurality of random access slots for transmitting random access data is provided, the plurality of random access slots of the random access time window being divided into at least two groups and the groups being allocated to respective priority classes, whereby the priority classes represent the transmission priorities of the random access data to be transmitted in the random access slots, with means for randomly choosing one or more random access slots from a group having a certain priority class corresponding to the transmission priority of the random access data to be transmitted, and means for transmitting the random access data in said chosen random access slot(s). This device for transmitting and receiving data according to the present invention can for example be a mobile station.

The above object is further achieved by a device for transmitting and receiving data in a code division multiple access communication system, in which a random access time window comprising a plurality of random access slots for transmitting random access data is provided, with means for dividing the plurality of random access slots of the random access time window into at least two groups, whereby the groups are allocated to respective priority classes, the priority classes representing the transmission priorities of the random access data to be transmitted in the random access slots, and means for transmitting information defining the groups of the random access time window. This device for transmitting and receiving data according to the present invention can for example be a base station.

According to the method and the devices of the present invention, the allocated random access channel resources are divided between different types of access on a priority basis. Thus higher priority access types receive more physical resources. This ensures, that some access types will have a better possibility of gaining access to the network due to the higher probability that a particular message will be successful in reaching the base station. The priority types and ratings can be tailored by the network and broadcast to a mobile station upon the broadcast control channel.

The method and the devices according to the present invention particularly lessens the effect of possible congestion on the random access channel caused by increased load, for instance packet data capacity requests, and the transfer of small amounts of user data within random access bursts.

Advantageously, the transmission priorities of the random access data to be transmitted are determined on the basis of the content and the type of the random access data. Further, in said device for transmitting and receiving data, which can be a base station, said means for dividing the random access slots into groups sets the number of random access slots in each group variably depending on system requirements. The size of each group is thus controlled by the network and can be dynamically changed depending on current traffic patterns, network requirements and so forth. A corresponding signal indicating the new groups will then be transmitted over a broadcast channel from the base station to the mobile stations.

Said device for transmitting and receiving data according to the present invention, which can be a mobile station, can further comprise means for extracting information defining the groups of the random access time window from a received broadcast signal. Each time the defined groups are changed by the network, a corresponding signal is broadcast from the respective base station. This signal is received by the mobile stations, in which above-mentioned means for extracting the information defining the groups extracts said information and uses the information for the following transmissions of random access bursts. The access probability can depend on the number of random access slots in the respective groups. Thus, groups with higher priority classes can comprise a larger number of random access slots than groups with lower priority classes.

Further advantageously, each random access slot in said random access time window is defined by a time offset value and a preamble code.

The advantages of the method and the devices of the present invention are a high flexibility in allowing prioritization of access related to the access type and subsequent prevention of congestion for certain access types which may be considered to have a higher access priority at the expense of those access types that may be considered to have a low access priority. A further advantage of the present invention is the ability to dynamically chose the quality of service level on a regular basis depending upon traffic conditions via a broadcast channel for different access types. The present invention further avoids deadlock situations, where random access channel re-transmissions combine with normal traffic to cause a system overload and then a collapse for certain types of traffic at the expense of others.

Figure 2:
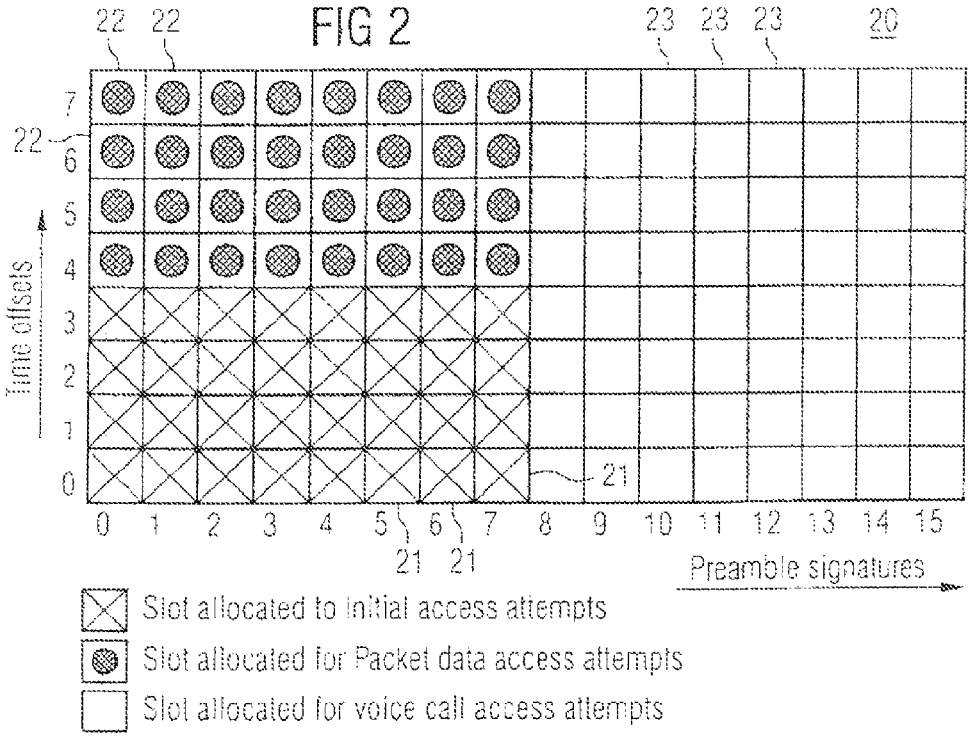

A preferred embodiment of the present invention is now explained in detail relating to the enclosed drawings, in which FIG. 1 shows a schematic diagram of a known random access time window, FIG. 2 allows a schematic diagram of a random access time window divided into groups according to the present invention.

Figure 3:
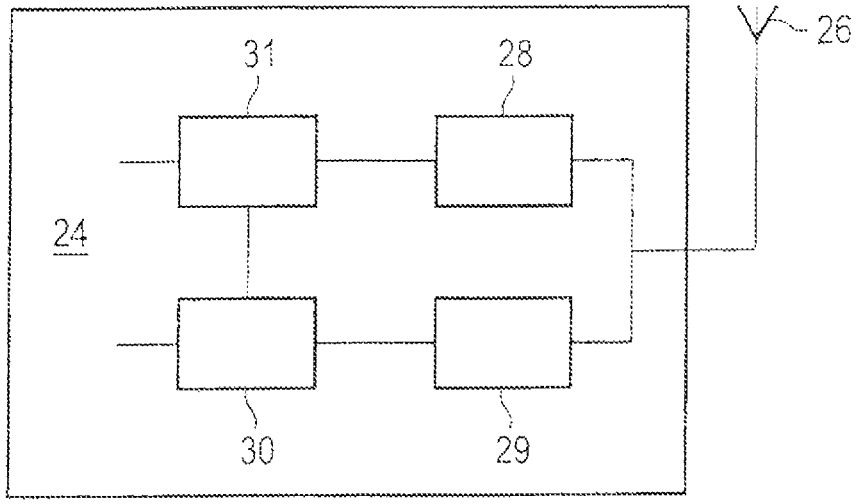
Figure 4:
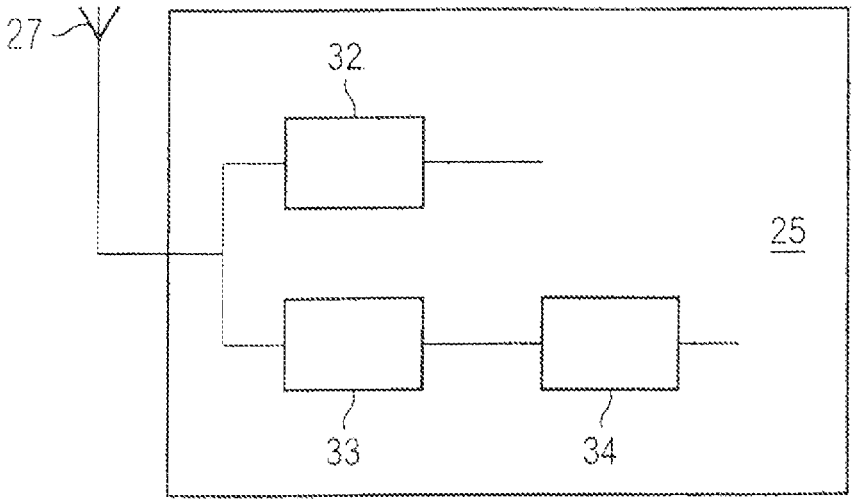

FIG. 3 shows a block diagram of a mobile station according to the present invention, and FIG. 4 shows a block diagram of a base station according to the present invention.

In FIG. 2, a random access time window 20 is shown, in which a plurality of random access time slots are provided. In the exemplary random access time window 20 shown in FIG 2, 128 random access time slots are provided, each of which is defined by one of 8 time of said values and of 16 preamble codes.

The random access time window shown as an example in FIG. 2 extends thus over one time frame of 10 ms, in which 8 time offsets, each of 1.25 ms are provided. As shown in FIG. 2, the random access time window is divided into three different groups of random access time slots. Each of the three groups has a different access priority. In the random access time window 20 shown in FIG. 2, 32 random access time slots 21 are allocated to initial access attempts. Initial access attempts are attempts from a mobile station to build up a connection with a base station. This first random access slot group is defined by the first eight preamble codes and the first four time offset values. The second group of random access slots 22 comprises also 32 slots and is allocated for packet data access attempts. These are attempts from mobile stations, which already have build up a connection with a corresponding base station and which to transfer packet data. The random access slots 22 of the second group are defined by the first eight preamble codes and the second four time offset values.

The third group of random access slots 23 is the largest group and is defined by the second eight preamble codes and all possible 8 time offset values. The random access slots 23 of the third group are allocated for voice call access attempts. These are attempts of a mobile station, which already has build up a connection with a base station and wishes to initiate a real time speech connection. Since the third group has the highest priority class, the third group has the largest number of random access slots 23 available so that a high probability of access is given for voice call access attempts.

In FIG. 3, a block diagram of a mobile station 24 according to the present invention is shown, and in FIG. 4, a block diagram of a base station 25 according to the present invention is shown. In the block diagrams shown in FIG. 3 and 4, only the elements necessary for explaining and incorporating the present invention are represented. It is to be understood, that both, the mobile station 24 shown in FIG. 3 as well as the base station 25 shown in FIG. 4 comprise all other necessary elements for transmitting and receiving data in a code division multiple access telecommunication system according to the present invention, for example, coding and decoding means, interleaving and deinterleaving means, modulating and demodulating means and so on.

The mobile station 24 shown in FIG. 3 comprises an antenna 26, a receiving means 28 and a transmitting means 29 for receiving and transmitting data over the antenna 26 to and from a corresponding base station, for example, the base station 25 shown in FIG. 4. The transmitting means 29 is coupled to a means 30 for randomly choosing one or more random access slots from the group having a priority class, which corresponds to the random access data to be transmitted. If, for example, the random access data to be transmitted by the mobile station 24 are packet data, the means 30 selects one or more random slots 27 in the case of FIG. 2 from the corresponding group. The means 30 for randomly choosing the random access slots from the corresponding group is connected to a means 31 for extracting corresponding group information from a broadcast signal received from a base station. A base station, for example the base station 25 shown in FIG. 4, broadcasts each time the network changes the group allocation in the raodom access time windows, a corresponding signal defining the groups to the connected mobile stations. In this case, the mobile union 24 receives the corresponding broadcast signal over the antenna 26 and the receiving means 28. The information defining the new groups in the random access time window is then extracted by the means 31 and transmit to the means 30, which correspondingly chooses required random access slots from the respective groups. The means 30 for randomly choosing random access slots from the corresponding group and the means 31 for extracting the group information are connected to other necessary elements of a mobile station 24 operating in a code division multiple access telecommunication system as required.

The base station 25 shown in FIG 4 comprises an antenna 27, a receiving means 32 and a transmitting means 33 for transmitting and receiving data to and from correspondingly connected mobile stations, for example, the mobile station 24 shown in FIG 3. The transmitting means 33 is connected to a means 34 for dividing the random access slots of the random access time windows into at least two groups. Thereby, the means 34 receives information on the system requirements, for example current traffic patterns and so on, to determine the new groups or to change the size of existing groups to adopt the telecommunication system dynamically to changing requirements. The means 34 further generates a corresponding signal containing the information defining the new groups of the random access time window, which is then broadcast by the transmitting means 33 to the connected mobile stations. The receiving means 32 as well as the means 34 for dividing the random access time windows into groups and generating a corresponding information signal are further connected to all the elements which are necessary to operate the base station 25 in a code division multiple access telecommunication system according to the present invention. These elements, however, are not shown for the sake of clarity.

According to the present invention, the available random access slots in the random access time windows 20 are divided into groups, for example, a first group of random access slots 21 allocated to initial access attempts, a second group of random access lots 22 allocated for packet data access attempts and a third group of random access lots 23 allocated for voice call access attempts. These groups are mapped to different priority classes and the size, i.e. the number of random access slots, of each group may depend upon current traffic levels and the required quality of service for that priority class. It is thereby possible, that the content of one group may overlap with another. When a random access message is to be sent upon the random access channel, then this message will fall into one of the priority classes, which will correspond to one group of random access slots. Which priority class the message falls into depends upon the message type and content. From this corresponding group a random choice will be made from the mobile station 24 regarding the random access slot or slots to be used. This ensures that a message from a certain priority class has a probability of successful access to the network equal to that of other messages of the same class sent by other mobile stations in the cell, but not necessarily as other random access messages of different priority classes. The size, i.e. the number of random access slots of the group dictates the probability of the access. The size of each group is controlled by the base station 25 and can be dynamically changed by the means 34 for dividing the random access time windows into groups and by broadcasting a corresponding information to the connected mobile stations. The means 34 thereby divides a random access time window 20 into groups depending upon current traffic patterns, network requirements or any other predesigned control parameter.

The information signal containing information on the groups in the random access time windows 20 which is broadcast by the transmission means 33 of the mobile station 25, can be a simple pair of digits. If for example the random access time window 20 of FIG. 2 is taken, the address of the random access slots could be taken as (0,3) for the time offset value access and (0,7) for the preamble code access, which would indicate the random access time slots 21 indicated as being reserved for initial access attempts. As stated above, the probability of access for each group can be changed dynamically by the network. In this fashion, control is allowed over the quality of service applied to particular access types.

An additional feature for reducing congestion on the random access slots and a more efficient use of the random access time window is to partition the groups of the raodom access time window respectively into at least a first section and a second section. The first section contains only contention based random access slots, whereas the second section only contains reservation based random access slots. The random access slots of the first sections of the groups are used for the usual contention based random access attempts, whereas the random access slots in the second sections can be reserved in succeeding random access time windows for the transfer of larger amounts of data, for example packet data. The partitioning of each group in the random time access windows can thereby also be dynamically controlled by the network depending on network requirements. A corresponding signal is broadcast to the mobile stations to change the partitioning of the groups.

What is claimed is:

[1. Method for transmitting and receiving data in a code division multiple access telecommunication system, comprising the steps of:

providing a random access time window comprising a plurality of random access slots for transmitting random access data from at least one first communication device to a second communication device, and dividing the plurality of random access slots of the random access time window into at least two groups each having a respective initial size, and allocating the groups to respective priority classes, whereby the priority classes represent the transmission priorities of the random access data to be transmitted in the random access slots, whereby the size of at least one of said groups is changed in accordance with changing needs such that a probability of access for the at least one group is dynamically changed, and whereby contents of one of said groups are permitted to overlap with another of said groups.]

[2. Method for transmitting and receiving data according to claim 1, characterized in, that the transmission priorities of the random access data to be transmitted are determined on the basis of the content and the type of the random access data.]

[3. Method for transmitting and receiving data according to claim 1 characterized in, that the number of random access slots in each group is variably set depending on system requirements.]

[4. Method for transmitting and receiving data according to claim 1, characterized in, that a first communication device, for transmitting random access data of a certain transmission priority, randomly chooses one or more random access slots from the group having the corresponding priority class.]

[5. Method for transmitting and receiving data according to claim 4, characterized in, that the access probability depends on the number of random access slots in the group.]

[6. Method for transmitting and receiving data according to claim 1, characterized in, that said second communication device periodically broadcasts information defining the groups of the random access time window to the at least one first communication device.]

[7. Method for transmitting and receiving data according to claim 1, characterized in, that each random access slot in said random access time window is defined by a time offset value and a preamble code.]

[8. Device for transmitting and receiving data in a code division multiple access telecommunication system, in which a random access time window comprising a plurality of random access slots for transmitting random access data is provided, the plurality of random access slots of the random access time window being divided into at least two groups each having a respective initial size, and the groups being allocated to respective priority classes, whereby the priority classes represent the transmission priorities of the random access data to be transmitted in the random access slots, with means for randomly choosing one or more random access slots from a group having a certain priority class corresponding to the transmission priority of the random access data to be transmitted, means for transmitting the random access data in said chosen random access slot(s), whereby the size of at least one of said groups is changed in accordance with changing needs such that a probability of access for the at least one group is dynamically changed, and whereby contents of one of said groups are permitted to overlap with another of said groups.]

[9. Device for transmitting and receiving data according to claim 8, characterized in, that the access probability depends on the number of random access slots in the group.]

[10. Device for transmitting and receiving data according to claim 8, characterized by, means for extracting information defining the groups of the random access time window from a received broadcast signal.]

[11. Device for transmitting and receiving data according to claim 8, characterized in, that each random access slot in said random access time window is defined by a time offset value and a preamble code.]

[12. Device for transmitting and receiving data in a code Division multiple access telecommunication system, in which a random access time window comprising a plurality of random access slots for transmitting random access data is provided, with means for dividing the plurality of random access slots of the random access time window into at least two groups each having a respective initial size, whereby the groups are allocated to respective priority classes, the priority classes representing the transmission priorities of the random access data to be transmitted in the random access slots, means for transmitting information defining the groups of the random access time window, whereby the size of at least one of said groups is changed in accordance with changing needs such that a probability of access for the at least one group is dynamically changed, and whereby contents of one of said groups are permitted to overlap with another of said groups.]

[13. Device for transmitting and receiving data according to claim 12, characterized in, that the transmission priorities of the random access data to be transmitted are determined on the basis of the content and the type of the random access data.]

[14. Device for transmitting and receiving data according to claim 12, characterized in, that said means for dividing the random access slots into groups sets the number of random access slots in each group variably depending on system requirements.]

[15. Device for transmitting and receiving data according to claim 12, characterized in, that each random access slot in said random access time window is defined by a time offset value and a preamble code.]

*16. Method for transmitting random access data in a code division multiple access telecommunication system, comprising the steps of;*

*randomly choosing one or more random access slots from a divided random access resource, and*

*transmitting the random access data in the chosen one or more random access slots,*

*wherein the divided random access resource is one of a plurality of random access resources provided by dividing available random access resources in accordance with priority classes being assigned to the plurality of random access resources respectively, and*

*wherein the divided random access resource is defined by at least one signature assigned from available 16 separate signature codes based on the priority class assigned to the divided random access resource.*

*17. Method for receiving random access data at a base station in a code division multiple access telecommunication system, comprising the steps of;*

*receiving the random access data transmitted from a mobile station, and*

*generating an information signal which is necessary to operate the base station,*

*wherein the random access data was randomly provided in one or more random access slots from a divided random access resource,*

*wherein the divided random access resource is one of a plurality of random access resources provided by dividing available random access resources in accordance with priority classes assigned to the plurality of random access resources respectively, and*

*wherein the divided random access resource is defined by at least one signature assigned from available 16 separate signature codes based on the priority class assigned to the divided random access resource.*

*18. Method for receiving random access data at a base station in a wireless telecommunication system, comprising the steps of;*

*receiving the random access data transmitted from a mobile station, and*

*generating an information signal for operating the base station,*

*wherein the random access data was randomly provided in one or more random access slots from a partitioned random access resource, the partitioned random access resource is established by partitioning available random access resources into a plurality of partitioned random access resources in accordance with a priority class which is assigned to the partitioned random access resource, wherein the partitioned random access resources is defined by at least one signature assigned as one of available 16 separate signature codes corresponding to the available random access resources.*

*19. Method for receiving random access data at a base station in a wireless telecommunication system, comprising the steps of;*

*receiving the random access data transmitted from a mobile station, and*

*generating an information signal necessary for operating the base station,*

*wherein the random access data was randomly provided in one or more random access slots from a partitioned random access resource at the mobile station, the partitioned random access resource is provided by partitioning available random access resources into a plurality of partitioned random access resources, each of the plurality of partitioned random access resources being defined by signature codes assigned from available 16 separate signature codes, in accordance with one or more priority classes assigned to the plurality of partitioned random access resources.*

*20. Method for receiving random access data at a base station in a wireless telecommunication system, comprising the steps of;*

*receiving the random access data transmitted from a mobile station, and*

*generating an information signal necessary for operating the base station,*

*wherein the random access data was randomly provided in one or more random access slots from a partitioned random access resource at the mobile station,*

*wherein available random access resources are divided into at least a first random access resource and a second random access resource, the first and second random access resources being defined by first one or more signature codes and second one or more signature codes, respectively, which are assigned from available 16 separate signature codes to correspond to the available random access resources, and*

*wherein priority classes corresponding to transmission priority of the random access data that is transmitted are assigned to the random access resources so that an access probability of the random access data in the first random access resource is different from an access probability of the random access data in the second random access resource.*

*21. Method for receiving random access data in a wireless telecommunication system, comprising the steps of;*

*defining random access resources provided by a plurality of random access slots and 16 separate signature codes,*

*dividing the plurality of random access resources into at least two groups, each group having random access slots and separate signature codes,*

*allocating the groups of the random access resources to respective priority classes,*

*broadcasting information of said allocation and groups of random access resources provided by the random access slots and signature codes, and*

*receiving random access data allocated to said groups of random access resources.*

*22. Method for receiving random access data in a wireless telecommunication system, comprising the steps of;*

*defining random access resources having a plurality of random access slots and 16 separate signature codes,*

*dividing the plurality of random access resources into at least two groups, each group having random access slots and separate signature codes,*

*allocating the groups of the random access resources to respective content or type of*

*broadcasting information of said allocation and groups of random access resources provided by the random access slots and signature codes, and*

*receiving random access data allocated to said groups of random access resources.*

*23. A code division multiple access telecommunication system, comprising:*

*means for randomly choosing one or more random access slots from a divided random access resource, and*

*means for transmitting the random access data in the chosen one or more random access slots,*

*wherein the divided random access resource is one of a plurality of random access resources provided by dividing available random access resources in accordance with priority classes being assigned to the plurality of random access resources respectively, and*

*wherein the divided random access resource is defined by at least one signature assigned from available 16 separate signature codes based on the priority class assigned to the divided random access resource.*

* * * * *